United States Patent [19]
Hall

[11] Patent Number: 5,554,003
[45] Date of Patent: Sep. 10, 1996

[54] CONTROLLABLE PITCH PROPELLER FOR PROPULSOR AND HYDROTURBINE

[76] Inventor: Arnold M. Hall, 68 Avondale Rd., Westerly, R.I. 02891

[21] Appl. No.: 446,960

[22] Filed: May 31, 1995

[51] Int. Cl.$^6$ .................................................. B63H 1/06
[52] U.S. Cl. ............................................ 416/140; 416/131
[58] Field of Search ............................... 416/43, 44, 46, 416/131, 140, 153

[56] References Cited

U.S. PATENT DOCUMENTS

| | | |
|---|---|---|
| 629,966 | 8/1899 | Otto . |
| 813,074 | 2/1906 | Barber . |
| 1,055,455 | 3/1913 | Esson . |
| 1,520,746 | 12/1924 | Boyce et al. . |
| 1,765,091 | 6/1930 | Morris . |
| 2,010,640 | 8/1935 | Michl . |
| 2,200,952 | 5/1940 | Farrell . |
| 2,246,539 | 6/1941 | Ruths et al. . |
| 2,290,666 | 7/1942 | Ashelman et al. . |
| 2,850,106 | 9/1958 | Swan . |
| 2,931,443 | 4/1960 | Pehrsson . |
| 2,955,659 | 10/1960 | Daley . |
| 2,988,156 | 6/1961 | Coleman . |
| 3,145,780 | 8/1964 | Kean . |
| 3,204,702 | 9/1965 | Brown . |
| 3,231,023 | 1/1966 | Marshall . |
| 3,295,610 | 1/1967 | Frias . |
| 3,497,306 | 2/1970 | Phillips . |
| 4,047,841 | 9/1977 | Laurin . |
| 4,140,434 | 2/1979 | Bianchi . |
| 4,231,317 | 11/1980 | Brandt et al. . |
| 4,693,671 | 9/1987 | Thornton, Jr. et al. . |
| 4,753,572 | 6/1988 | Kusiak .................................. 416/46 |
| 4,929,153 | 5/1990 | Speer . |
| 5,032,057 | 7/1991 | Speer . |
| 5,129,785 | 7/1992 | Speer . |
| 5,326,223 | 7/1994 | Speer . |

FOREIGN PATENT DOCUMENTS

| | | | |
|---|---|---|---|
| 0468498 | 10/1950 | Canada ............................... | 416/153 |
| 3110695 | 10/1982 | Germany ............................ | 416/140 |
| 3901672 | 8/1990 | Germany ............................ | 416/153 |

Primary Examiner—Edward K. Look
Assistant Examiner—Christopher Verdier
Attorney, Agent, or Firm—Nies, Kurz, Bergert & Tamburro

[57] ABSTRACT

A controllable pitch propeller for application principally to sailboats employing electric auxiliary power. The design addresses a highly efficient approach to performing four basic functions desirable on sailing vessels that have electrical, or internal combustion, auxiliary power and onboard electrical systems typically employing batteries. The design employs no external nor remote actuator means; instead, blade position (nominal pitch) is inherently "controlled" by the direction of shaft rotation and whether the propeller is acting as a propulsor or a turbine. The four basic functions, or configurations, performed by the design are 1) forward propulsion, 2) reverse propulsion, 3) efficient power generation as a turbine, and 4) feathering for no-power minimum drag. The propeller includes a cambered blade configured with a cross section that would purposely act efficiently with fluid inflow impinging on either edge, depending upon the function being performed.

18 Claims, 7 Drawing Sheets

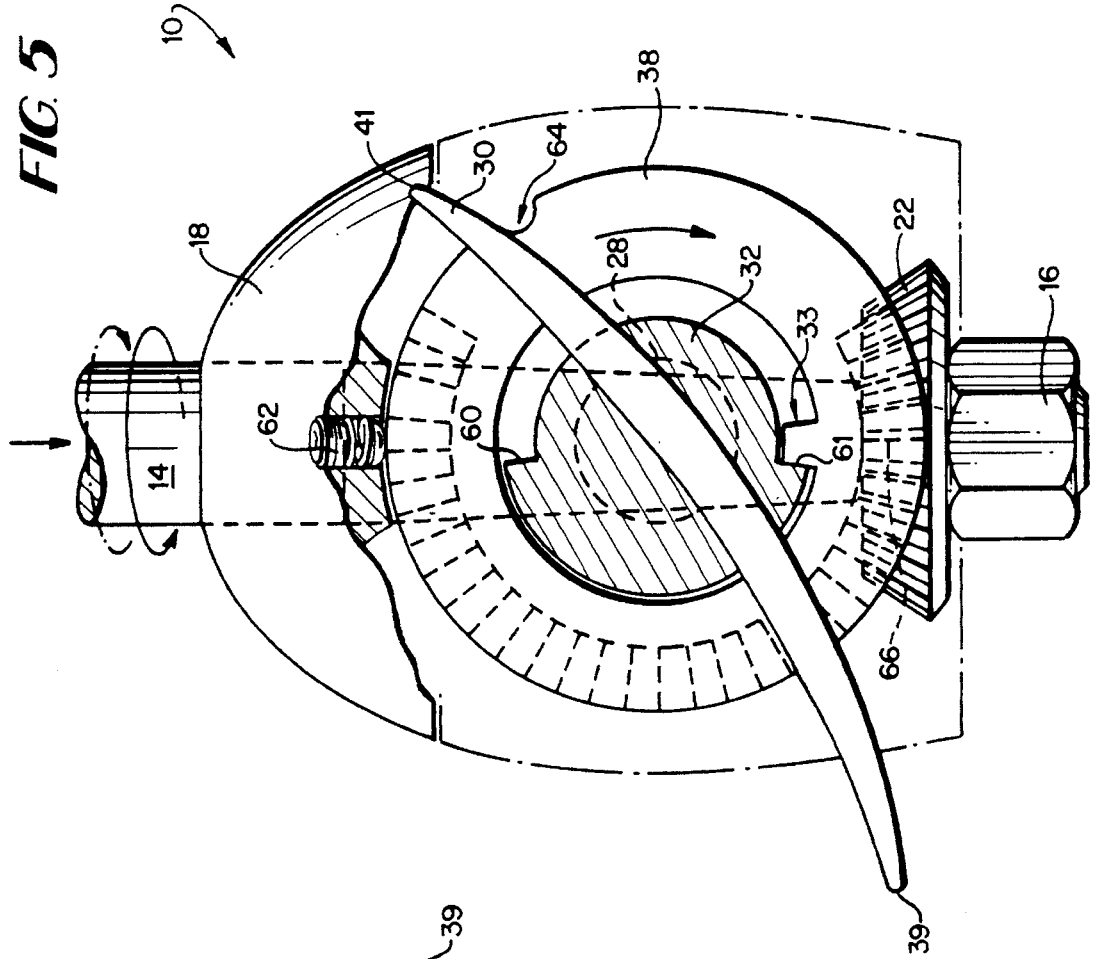
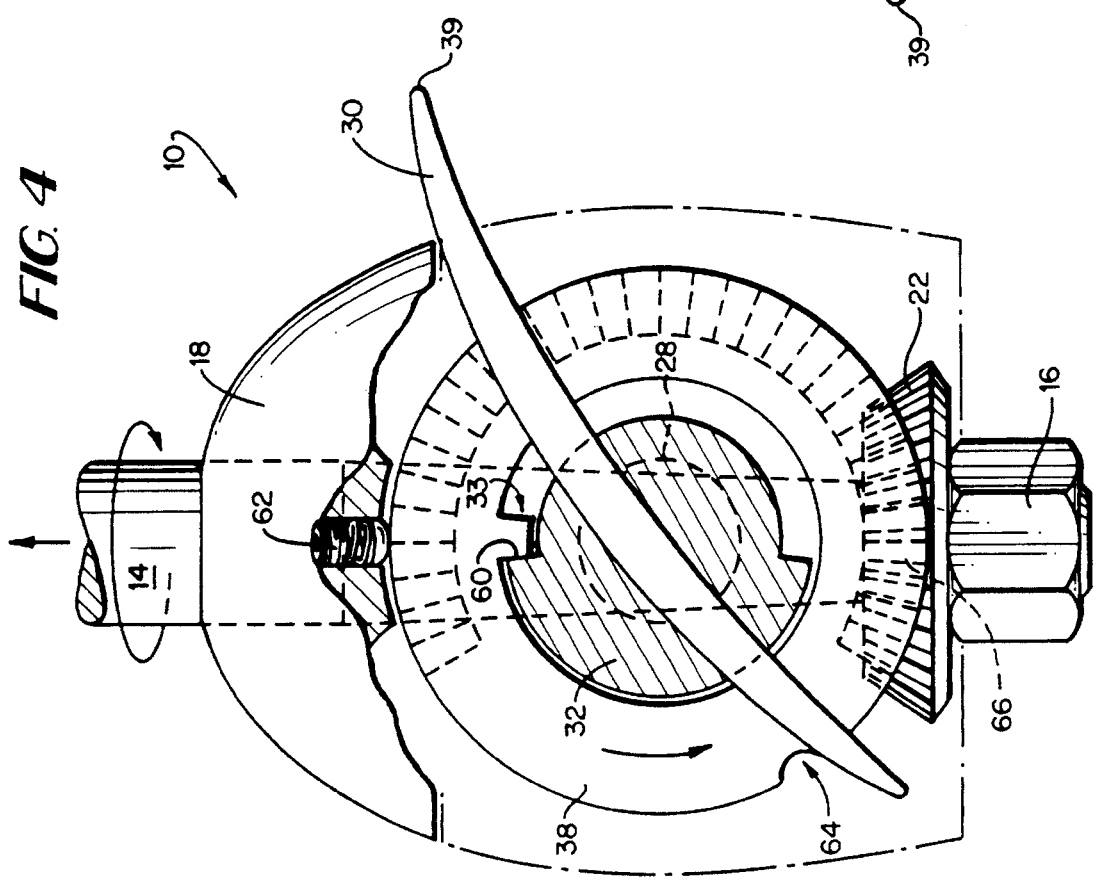

CONTROLLABLE PITCH PROPELLER FOR PROPULSOR AND HYDROTURBINE

BACKGROUND AND SUMMARY OF THE INVENTION

This invention relates to propellers and more particularly to controllable pitch propellers which can function efficiently in four modes: forward thrust, reverse thrust, neutral, and power generation.

Auxiliary propulsive power on sailboats typically is provided via an inboard or outboard mounted engine/motor which develops thrust by means of a shaft mounted propeller interacting with the water. The simple propeller has the blades fixed to the hub and creates forward or reverse thrust by virtue of shaft rotation direction. The simple propeller has an undesirably high drag when sailing only and such drag can be mitigated by allowing the propeller to freely spin or, in the case of a two-bladed propeller, the blades may be "hidden" behind the keel or other appendage.

To accomplish the sailing-only mode with the drive shaft essentially stopped, propellers created for low drag typically either allow the blades to fold back when sailing to present a small profile to the oncoming fluid, or allow the blades to take a "feathered" position approximately parallel to fluid flow to minimize interference with the oncoming fluid. Both of these approaches must also incorporate a feature to provide reverse thrust, either by some remote mechanism or by self-adjustment, to position the blades in the extended position or in a reverse pitch (negative angle of attack) position. These propellers are relatively inefficient in the reverse mode if cambered blade sections are employed to maximize forward thrust. Alternatively, if flat, non-cambered blade sections are employed, forward and reverse thrust are equally powerful yet not optimally efficient.

None of the above propeller types have been designed for, or employed as, a power turbine to extricate rotary power from the flow of fluid. While there are devices to perform the turbine-type function, from instrument-level power of anemometer-type devices to towed impellers coupled to small generators, they are not designed also for main propulsion and maneuvering.

The present invention provides the capability of propulsion, maneuvering (reversing), power generation and low drag from a single efficient hydrodynamic device. Such a capability provides a wide range of applications for the boating industry and is of particular importance with the renewed interest in electric powered watercraft and the extensive array of electronic devices available to the boater.

Previous apparatus related to controllably varying propeller blade pitch positions are described in the following U.S. Pat. Nos. 629,966 to Otto; 813,074 to Barber; 1,055,455 to Esson; 1,520,746 to Boyce et al; 1,765,091 to Morris; 2,010,640 to Michl; 2,200,952 to Farrell; 2,246,539 to Ruths et al.; 2,290,666 to Ashelman et al.; 2,850,106 to Swan; 2,931,443 to Pehrsson; 2,955,659 to Daley; 2,988,156 to Coleman; 3,145,780 to Kean; 3,204,702 to Brown; 3,231,023 to Marshall; 3,295,610 to Frias; 3,497,306 to Phillips; 4,047,841 to Laurin; 4,140,434 to Bianchi; 4,231,317 to Brandt et al.; 4,693,671 to Thornton, Jr. et al.; and 4,929,153, 5,032,057, 5,129,785, and 5,326,223, all to Speer.

Of this prior art, U.S. Pat. No. 1,765,091 to Morris describes an arrangement which functions as self-activating, or "automatic" to vary the propeller blade pitch. The Morris design is configured specifically for an aircraft propeller and, as embodied, employs springs to fine tune blade pitch within less than a 90 degree range. Thus, unlike the present invention, the Morris construction does not allow total reversal of blade camber, i.e., rotating the blade pitch at least 180 degrees.

In U.S. Pat. No. 4,047,841 to Laurin, there is disclosed a propeller which varies blade pressure distribution depending on the function to be performed by the propeller. However, the Laurin propeller has its blade section optimized with only one edge as the leading edge and therefore is incapable of efficiently using either edge as the leading edge.

In U.S. Pat. No. 4,140,434 to Bianchi, there is disclosed a propeller constructed to operate in the forward, reverse, and feathering mode, but which is not capable of operating efficiently as a turbine, or power generator. The Bianchi propeller also has its blade section optimized with only one edge as the leading edge, thereby suffering from the same shortcomings as Laurin. Additionally, the nominal pitch adjustments of Bianchi employ an extra gear set in contrast to the present invention.

None of the above patents describes the controllable pitch propeller of the present invention wherein a cambered blade section is configured and positioned in the correct orientation for all modes of operation including a turbine, or power generating, mode.

It is thus one object of the present invention to provide a self-adjusting propeller device capable of selectively transmitting forces in either axial direction during use.

It is another object of the present invention to provide a device having minimal drag when not in use by self-adjustment of the blade pitch to pivot the blades to a minimal drag position, such as parallel to fluid flow.

It is a further object of the present invention to provide a minimal drag device which is highly efficient providing reverse as well as forward thrust.

It is yet another object of the present invention to provide a device capable of self-adjustment to act as an efficient turbine capable of taking rotary power from the passing fluid.

It is another object of the present invention to provide a device having a minimal number of parts and being relatively inexpensive to manufacture.

It is still another object of the present invention to provide a device whose construction provides ready interchangeability by means of the same shaft mounting as employed by conventional marine propellers or propulsors.

It is a further object of the present invention to provide a construction which is virtually maintenance free when operated in the manner intended.

It is yet another object of the present invention to provide a construction which can be "factory set" to achieve the best performance for each of a variety of specific applications, i.e., high-versus-low boat drag and particular shaft rotational speeds.

It is another object of the present invention to provide a self-adjusting propeller device which operates smoothly without inherent vibration or blade flutter.

It is still another object of the present invention to provide a self-adjusting propeller device whose hub is of minimal cross-section thus contributing to high overall efficiency of the device.

The present invention is a variation from mechanical controllable pitch configurations known as automatic variable propeller pitch devices. The following discussion identifies the functional particulars of the present invention.

The blade pitch of the present invention is concerned primarily with the "nominal" pitch, or orientation of the blade with respect to the drive shaft line, i.e., hub. Blades typically are helical in form with pitch varying from hub to tip in an efficient hydrodynamic manner. This invention provides for a cambered blade section form to be in the correct orientation, or sense, for all modes of operation. That is, the blade is designed to act efficiently regardless of which edge the fluid flow encounters first. This camber orientation necessitates a range of blade rotation about the blade axis of approximately 180 degrees.

Each blade in the installed condition is fastened at its base to a driven bevel gear which is captured by a pivot post and capping disc, thereby allowing the blade to rotate in pitch about the post axis. The gear on each blade engages the pinion and is sized to allow clearance with adjacent gears. The manner of fastening the blades to the bevel gear parts allows for convenient installation of the pivot post capping discs and provides for interchangeable selection of blades and easy repair. A rotational stop feature with or without shock-absorbing features is incorporated between each blade gear and capping disc to limit rotation of each blade at the point of optimal efficiency. Discs may be selected from an array of types and stop locations to match the overall required hydrodynamic performance of the device.

While one blade will suffice for purposes of the present invention, two or three are more practical for application to free-stream propulsors/impellers. The blade nominal camber mid-point can be located at the centerline of the blade pitch pivot or in a biased off-center position so as to provide the most appropriate balance of blade forces and torques and particularly to orient the blades in a minimal drag position when not transmitting power. The blade cross-section is approximately similar at both the leading and trailing edges, with appropriate camber and thickness to perform the desired hydrodynamics and structural functions. The blade camber and pitch form is conventionally helical from the hub to tip.

Operation of the subject invention is as follows:

In the forward or reverse thrust mode, the shaft may be driven in either clockwise or counterclockwise direction. As the shaft is engine/motor driven, a blade drag force creates a torque about the shaft and a torque between the pinion and the blade pivot axis. The torque about the drive shaft causes the outer part of the hub assembly to lag behind the shaft sleeve-with-pinion as it rotates on the journal bearing. The torque about the blade pivot axis causes the blade to rotate until it encounters the stop mechanism. To go to another mode wherein the shaft rotates in the opposite sense, such as, for example, reverse versus forward, the opposite motions take place with another stop being appropriately located where blade pitch angle is approximately 180 degrees, or reverse camber, from the previous position.

In the turbine mode, the drive shaft is driven by the propeller. This construction provides for this to take place with the blades positioned in the reverse propulsion sense. Blade force, and related torque about the drive shaft, are in the sense that locate the blades relative to the hub against the reverse propulsion stop. The torque about the drive shaft created by the blades oriented as a turbine, wherein the camber is inverted from forward propulsion, causes the shaft to rotate in the forward propulsion sense. This is inherently accommodated by an electric motor/generator, or "dynamo" -type device.

In the low drag mode, when no power transfer through the drive shaft is desired, the blades may be allowed to "feather". This feature is accomplished by the location of the blade cross-section relative to the blade pivot axis to institute a balance of forces that causes the blade pitch orientation to seek a "neutral" position. No absolute stop mechanism is employed for this feature as this motion is inherent in the baseline construction; however, a detent-type mechanism may be incorporated to prevent blade flutter or pitch angle hunting. Also, the optional incorporation of a brake on the shaft at its inboard end, i.e., in the proximity of the motor/generator, enhances the feathering characteristics of the device.

BRIEF DESCRIPTION OF THE DRAWINGS

FIG. 4 is a top schematic view of the propeller of the present invention showing the device operating in the forward thrust position.

FIG. 5 is a top schematic view of the propeller of the present invention showing the device operating in the reverse thrust and turbine position.

DESCRIPTION OF THE PREFERRED EMBODIMENTS

Figure 1:
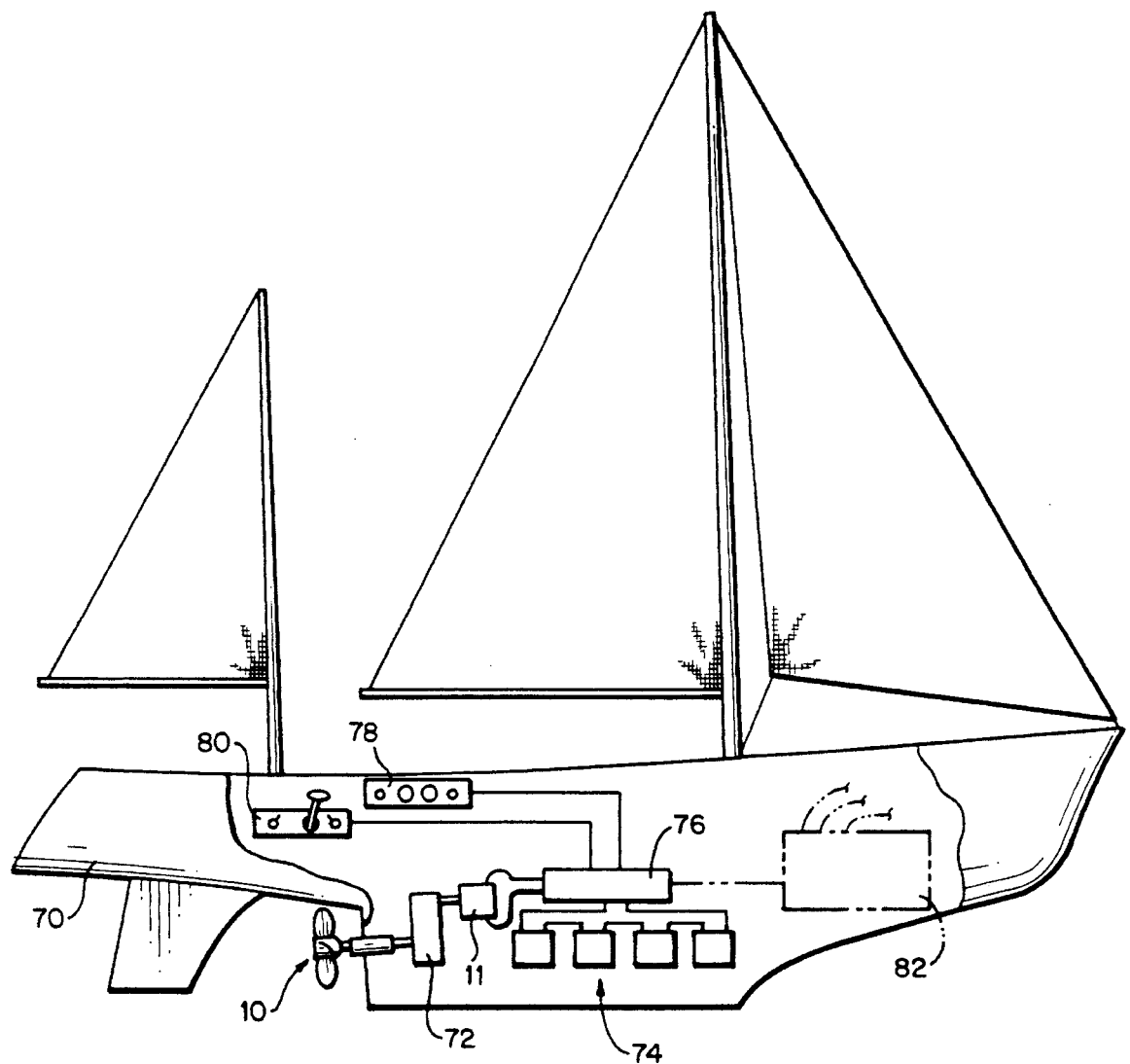
FIG. 1 is a schematic view showing the propeller of the present invention mounted on a shaft of a sailboat.
Figure 2:
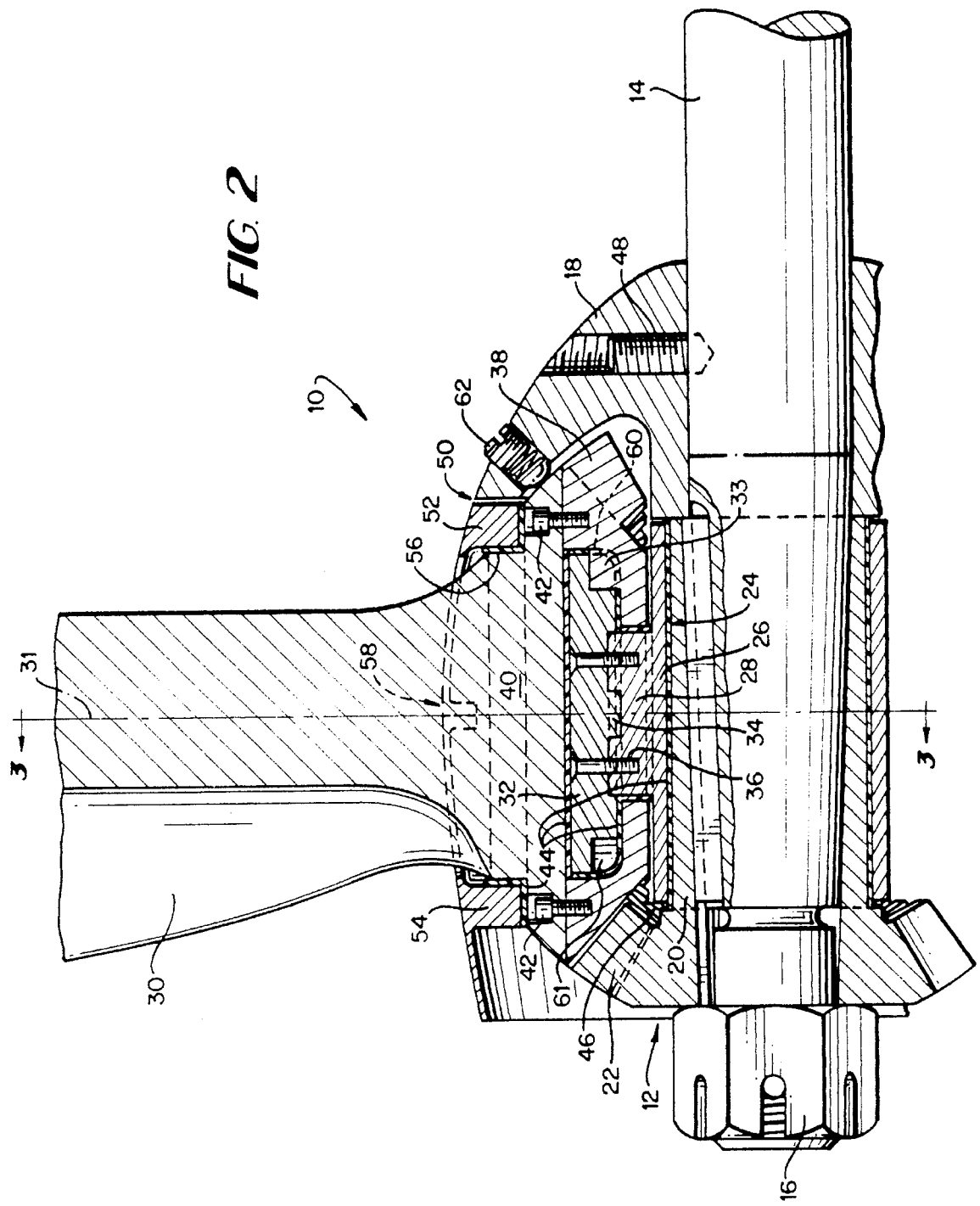
FIG. 2 is a side elevation of the propeller of the present invention, showing the top blade in partial cross-section.

While there are numerous variations in the design of the mechanism and the shaft mounting feature to perform the multiple functions discussed herein, the baseline arrangement is illustrated in FIGS. 1 through 7b as fitted to a standard marine tapered shaft of an electric auxiliary sailing vessel 70 and is intended to operate in conjunction with an electric motor/generator 11. The typical sailing vessel 70 employing this arrangement may be provided with a transmission 72 for reducing or increasing shaft speed, a series of batteries 74 for providing electric power and an electronic controller 76 which provides controlled power to the motor/generator 11 and electronic signals to status instruments 78. The propulsion speed/reversing control and charging selection controls 80 provide input to the controller and are readily accessible to the operator of the vessel 70. Additionally, such a sailing vessel 70 may already be provided with a separate on-board charging system 82 receiving power from a wind turbine, solar panels, or dockside electricity, for example. The helically formed comprehensive blade configuration is intentionally omitted for clarity.

Referring to FIGS. 1 through 7b, there is provided a variable pitch propeller 10 having a hub assembly 12 mounted on a standard marine shaft 14 and constrained axially on the shaft 14 by a conventional propeller nut 16 and a thrust collar or fairing 18 separately attached to the drive shaft 14. The propeller nut 16 is capable of supporting reverse-wise thrust and the thrust collar 18 supports forward thrust while providing a smooth outline for the propeller 10 and reduces drag. The hub assembly 12 includes a shaft sleeve 20 which incorporates a bevel gear driver pinion 22 and which has an appropriately tapered bore and keyway so as to be intimately mounted on the shaft 14. The internal bore of the shaft sleeve 20 can be configured to fit candidate shafts such as a standard tapered shaft, a straight cylindrical shaft, or a shouldered shaft (see FIG.8) and the outer diameter of the shaft sleeve 20 is a smooth, journal bearing-type surface. The driver pinion 22 is incorporated on the outboard end of the sleeve 20.

Figure 3:
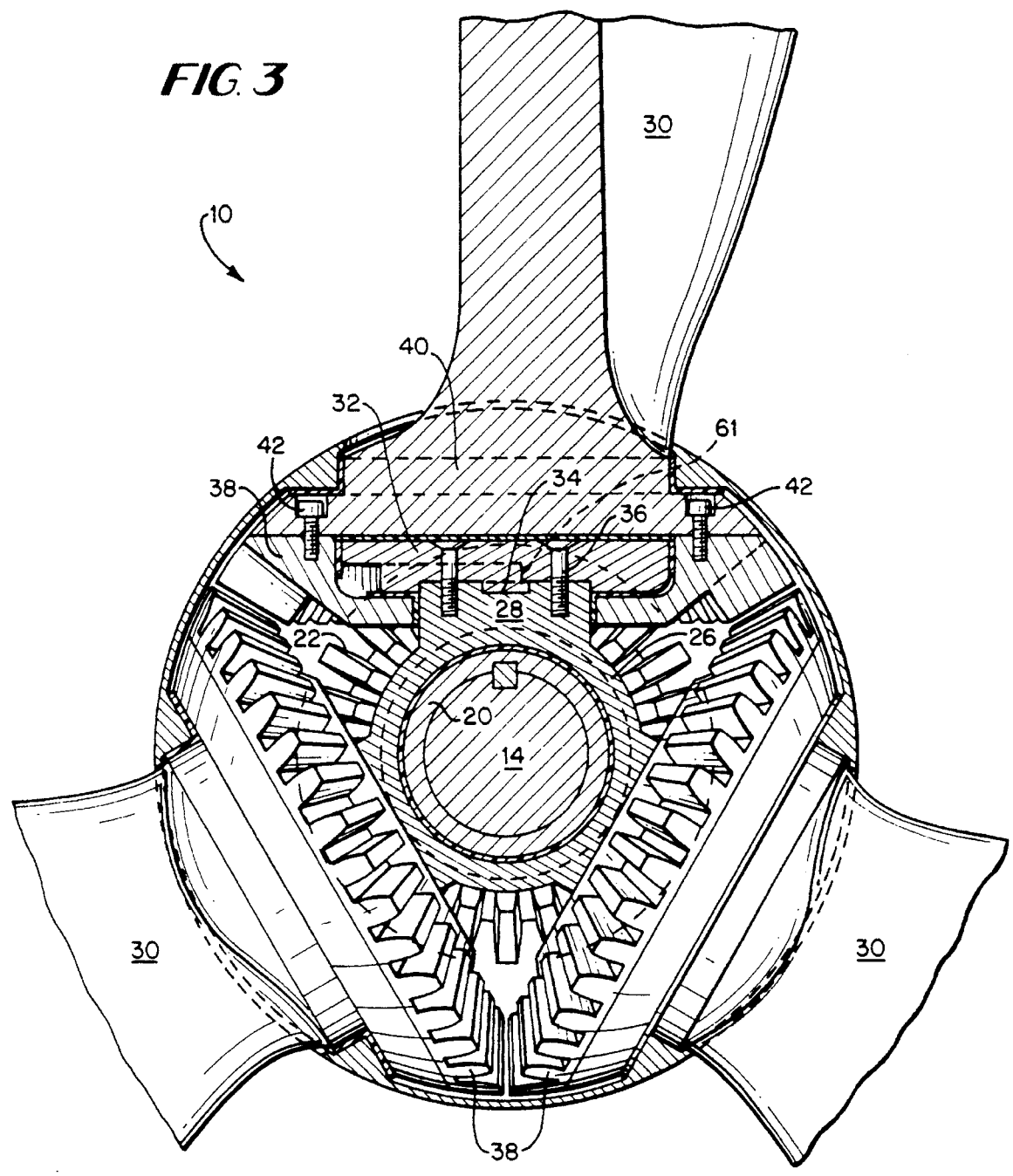
FIG. 3 is a rear cross-sectional view of the propeller of the present invention taken along the line 3—3 of FIG. 2.
Figure 7B:
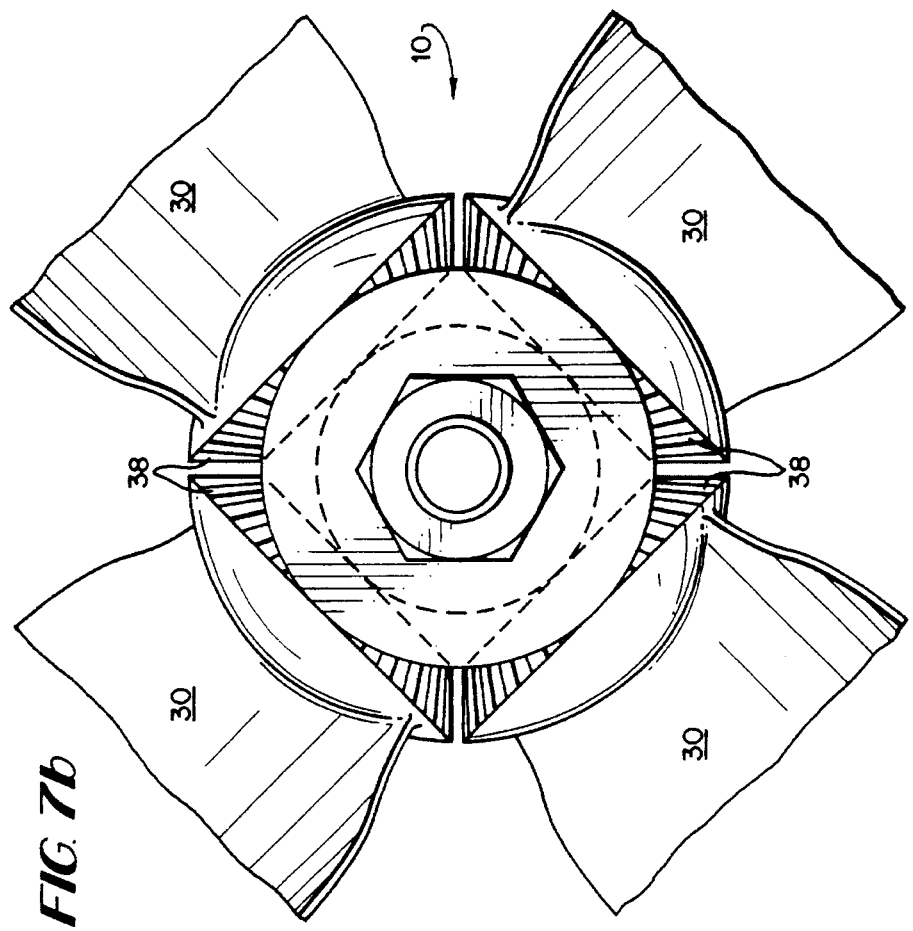
FIG. 7b is a front schematic view of a different embodiment of the present invention showing the propeller with four blades.
Figure 7A:
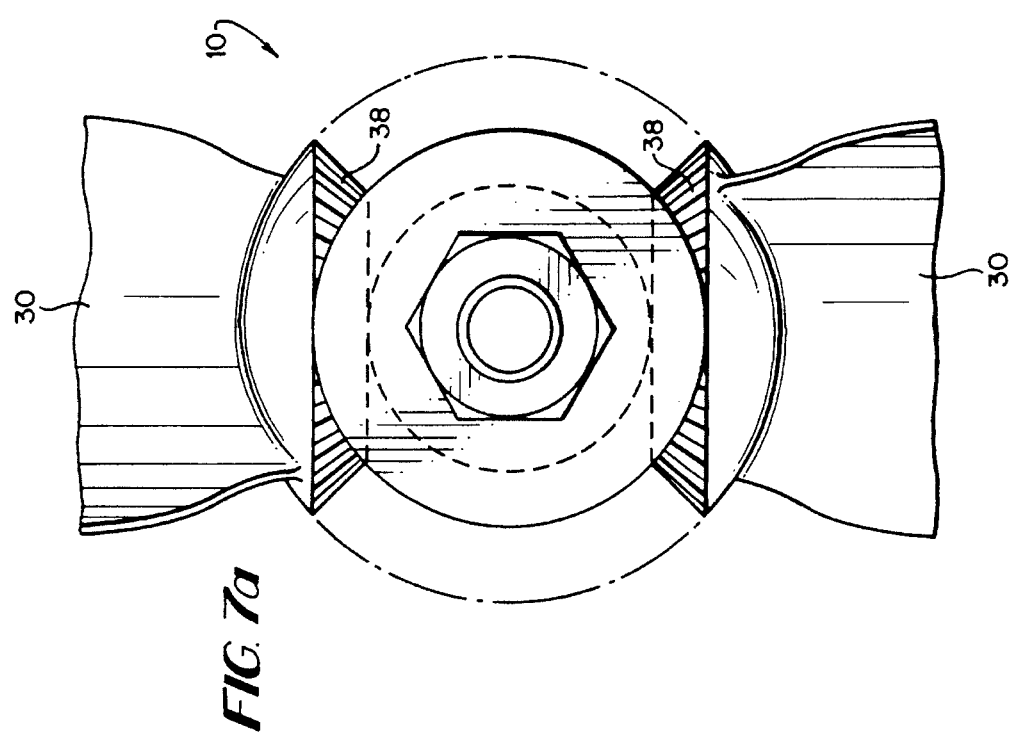
FIG. 7a is a front schematic view of a different embodiment of the present invention showing the propeller with two blades.
Figure 8:
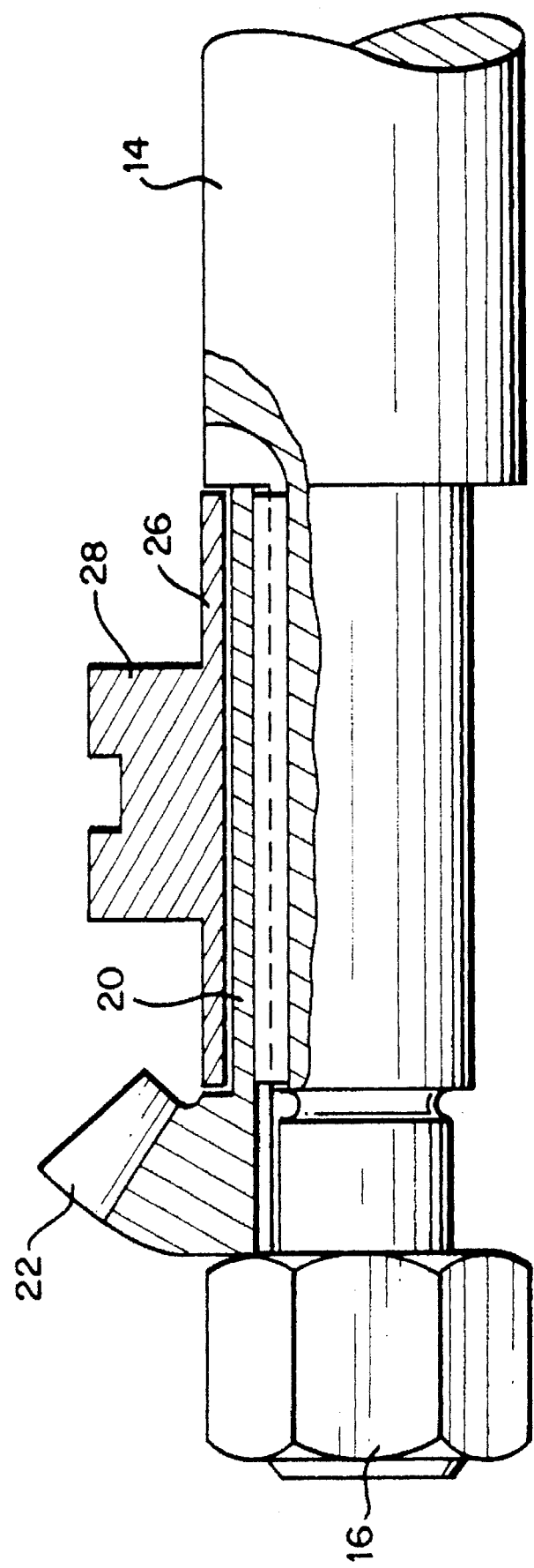
FIG. 8 is a side elevation in partial cross-section of one embodiment of the propeller of the present invention, showing a shoulder shaft.

The hub assembly 12 also includes a floating sleeve 26 positioned about the journal bearing surface 24 of the shaft sleeve 20. The floating sleeve 26 has a pivot post 28 at each blade location and is free to revolve about the shaft axis. For each blade 30, a pivot capping disc 32 is interlocked as at 34 and fastened as at 36 to the respective pivot post 28 providing capturing bearing surfaces to secure a driven bevel gear 38 to the pivot post 28. As shown in FIGS. 3, 7a, and 7b, the blades 30 are preferably located symmetrically about the circumference of the hub assembly 12 with each blade gear 38 meshed with the pinion 22 but not meshed directly with the gears of the other blades. The base 40 of each blade 30 is fastened to the driven bevel gear 38 by an array of screws 42 which can allow fine rotational adjustment when the holes in the base 40 of the blade 30 are optionally slotted in elongated form.

The principal bearing surfaces 44 can be simple clearance interfaces with the ambient fluid, typically water, as lubrication. In an alternative embodiment, bearing inserts can be incorporated such as minimal friction wear coatings or bearing sleeves of metal or plastic. Self-contained roller or ball-type bearings can also be incorporated.

The floating sleeve 26 is constrained axially, without restriction to revolving motion, by a shoulder shape 46 at the back or pinion end and the thrust collar 18 at the front end. The thrust collar 18 is securely attached to the shaft by one or more set screws 48, for example, so as to transfer forward thrust to the shaft 14 while providing clearance for the floating sleeve 26 to revolve relative to the shaft 10. The outer surface of the thrust collar 18 is configured for good fluid flow characteristics terminating in a trailing outer circumferential surface 50. In the preferred configuration, a shroud having a forward 52 and aft 54 section provides a continuous fluid dynamic surface from the thrust collar 18. The shroud sections 52 and 54 form the circumferential outer boundary of the hub assembly 12 and incorporate cutout areas so as not to restrict blade pivoting. In one embodiment, the shroud sections are non-load bearing and therefore can be made of a non-metallic material.

Figure 6:
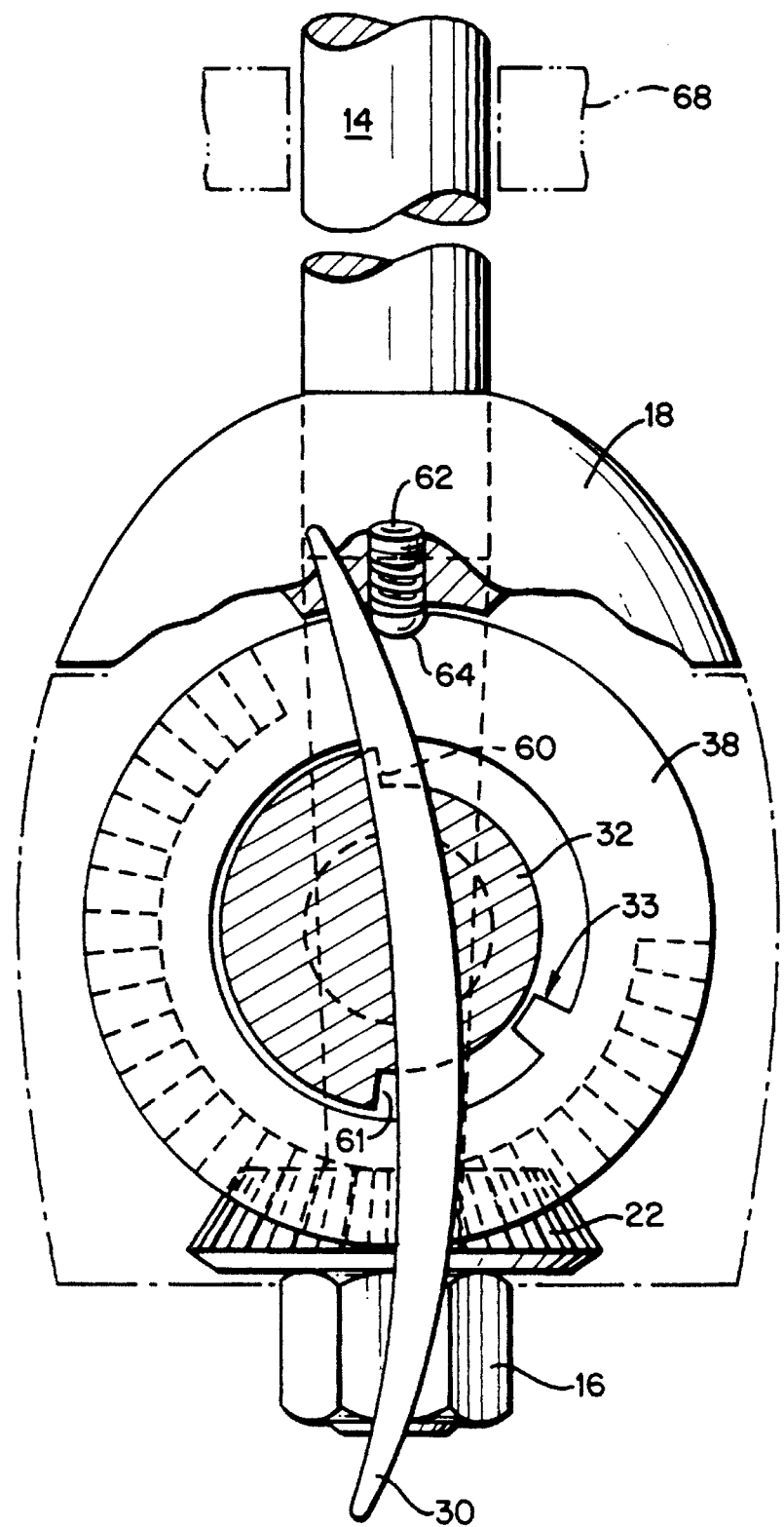
FIG. 6 is a top schematic view of the propeller of the present invention showing the device operating in the feathering, or, neutral position.

Each blade 30 is formed with a cylindrical bearing surface 56 at its base 40 about which the shroud sections 52 and 54 float circumferentially while allowing the blades 30 to rotate about their respective axes 31. The two shroud sections 52 and 54 are mated at joint 58 by fastenings or by an interlocking design after the hub assembly 12 and blades 30 have been assembled. Shown also on FIGS. 2 and 3, with further detail on FIGS. 4, 5, and 6, is a stop mechanism 60, 61 incorporated into the pivot capping disc 32 which limits the extreme positions of blade pitch by acting directly upon a step 33 located on each driven blade gear 38. Between forward and reverse or turbine modes, these stop mechanisms 60, 61 allow blade rotation of at least 120 degrees and, in the preferred embodiment, approximately 180 degrees.

With a step 33 provided for each blade gear 38, the load accompanying each mode change is thereby spread out over the total number of blades 30, thereby allowing smoother and quieter mode changes. Pitch adjustment and range of pitch variation can be accomplished simply by interchanging pivot capping discs 32 at the base 40 of each blade 30. In one embodiment of the invention, an idler may be employed between the drive pinion 22 and each blade gear 38 to transfer motion between the gears 22, 38.

Referring to FIG. 4 for operation of the device as a propeller in the forward mode, it is shown that with motor torque applied in the clockwise sense (as viewed from aft) the shaft 14 and drive pinion 22 rotate clockwise causing the driven bevel gear 38 and blade 30 to rotate counterclockwise (as viewed from top) due to a force couple between the applied force at the engaged gear teeth 66 and the circumferential blade drag manifested at the pivot post 28. The thus induced counterclockwise motion of the gear 38 and blade 30 continues until the gear step 33 engages the stop 60 on the pivot capping disc 32. With the driver pinion 22 incorporated on the outboard end of the sleeve 20, the gear 38 is strongly or positively locked to the stop 60 in this forward mode. The location of stop 60 determines an optimal forward thrust for the device over the range of criteria as dictated by forward speed and motor speed-torque characteristics in a conventional manner. While clockwise torque is applied by the motor, the blade pitch remains fixed and stable.

Referring to FIG. 5 for operation of the device as a propeller in the reverse mode, it is shown that with motor torque applied in the counterclockwise sense, the shaft 14 and the drive pinion 22 rotate counterclockwise, as indicated by the solid arrow, causing the driven bevel gear 38 and blade 30 to rotate clockwise due to a force couple between the engaged gear teeth 66 and the pivot post 28 in the opposite sense from FIG. 4. The induced clockwise motion of gear 38 and blade 30 continues until the gear step 33 engages the stop 61 on the pivot capping disc 32. As in the forward mode, the location of stop 61 determines an appropriate reverse thrust of the device and the blade pitch remains fixed and stable while counterclockwise torque is applied by the motor. For this reverse mode, the blades have pivoted on their respective axes approximately one-half turn, or 180 degrees, from the forward mode and blade camber is again in the correct sense. The leading edge 39 of the blade 30 is the same in the reverse mode as it is in the forward mode.

Continuing to refer to FIG. 5, when the device is employed as a turbine-type impeller, the blade orientation is the same as in the reverse mode. This mode is nominally accomplished by reduction of applied reverse motor torque until the shaft 14 is driven in the forward or clockwise sense, as indicated by the dashed arrow, by fluid dynamic forces on the blades which, in turn, apply force at gear mesh 66 and a corresponding clockwise torque to the shaft 14 at the impeller end. The fluid dynamic forces may be created when the device is, for example, attached to a sailing vessel being operated in the sailing mode. In a conventional balance of steady-state torques, the impeller applied torque is resisted by electrical generator counterclockwise torque at the motor/generator in a manner often referred to in wheeled electric vehicle terminology as "regenerative braking". By appropriate design location of the blade pivot axis 31 and the location selection of stop 61, the device can be optimized as a fluid dynamic turbine and will efficiently perform this function in a stable manner over a practical range of ambient fluid/vessel speeds. In performing this function, the leading edge 41 of the blade 30 is at the opposite end of the leading edge 39 employed when the device is in the forward or reverse propulsion mode. This does not affect the efficiency of the propeller 10 as the cambered blade is designed with each edge having a similar cross-sectional profile to allow the blade 30 to operate efficiently regardless of which edge 39, 41 is the leading edge.

Referring to FIG. 6 for the non-operational neutral mode known as "feathering", it is shown that in the condition with little, or no, transmitted shaft torque the blade 30 will seek a minimal frontal area to the ambient fluid flow thereby minimizing fluid dynamic forces and moments acting on the blade, if the blade pivot axis is appropriately selected in conjunction to the blade cross-section and radial form. In this condition, the driven gear step 33 locates between stops 60 and 61. A detent mechanism 62 may also be incorporated to act between the thrust collar 18 and the blade base 40 of at least one blade 30 when the device is in the feathering, or neutral, mode, as shown in FIG. 6. The detent 62 may consist, nominally, of a screw-adjustable elastomeric tipped detent protrusion which engages a corresponding cavity 64 on the associated surface of the blade base 40. The detent 62 is preferably adjustable to adequately secure the blades in the neutral position while allowing for override upon modest application of shaft torque. To attain the detent engaged position, one method is to proceed from the reverse and turbine position (FIG. 5) to the feathering position by the application of a slight forward sense (clockwise) torque at the motor.

Additionally, a brake 68 can be applied to the drive shaft 14 in conjunction with the motor/generator location. This embodiment is particularly useful for a two-bladed device, such as shown in FIG. 7a, operating in the shadow of a vessel's underwater appendages such as a skeg or keel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fluid dynamic propeller device adapted to be mounted on a drive shaft for driving said drive shaft and for being driven by said drive shaft in a forward direction and a reverse direction, comprising:

a hub assembly having a floating sleeve which is positioned about said shaft;

at least one blade rotatably journalled on said hub assembly for rotation about a blade axis substantially perpendicular to the length of said shaft;

means for integrating motion of said shaft with said at least one blade; and stop means for limiting rotation of said at least one blade in a first direction about said blade axis at a first stop position and limiting rotation of said at least one blade in the opposite direction about said blade axis at a second stop position, said first and second stop positions being at least 120 degrees apart about said blade axis.

2. The device of claim 1 wherein said at least one blade is cambered and has a first edge and a second edge, said first and second edges being of similar cross-sectional profile.

3. The device of claim 1 including constraining means for constraining rotation of said at least one blade at a third stop position between said first and second stop positions to induce said device to operate at minimal fluid dynamic drag when said shaft is not under a torque load.

4. The device of claim 1 wherein said at least one blade is positioned at one of said stops to allow said device to act as a turbine and drive said drive shaft.

5. The device of claim 1 wherein the positioning of said at least one blade is self-actuating according to the direction of rotation of said drive shaft.

6. The device of claim 1 wherein said hub assembly fits a tapered drive shaft.

7. The device of claim 1 wherein said hub assembly fits a shouldered straight cylindrical drive shaft and the shoulder serves to axially constrain the floating sleeve.

8. The device of claim 1 wherein the range of blade pitch angle between said first stop position and said second stop position is approximately 180 degrees with respect to the centerline of said drive shaft.

9. The device of claim 1 wherein said at least one blade has a blade base freely rotating about said floating sleeve, said blade base being secured to a blade gear, and wherein said means for integrating motion includes a drive pinion at the outboard end of said shaft which operably engages said blade gear.

10. The device of claim 9 wherein said blade base rotates within limits about said sleeve.

11. The device of claim 9 including a fluid dynamic forward thrust collar separately attachable to said drive shaft for supporting forward thrust.

12. The device of claim 9 including a shroud engaging the outer portion of said blade base and providing a continuous fluid dynamic outer circumferential surface for said hub assembly about said shaft, said shroud being in fluid dynamic communication with said thrust collar and being free to revolve about said shaft.

13. The device of claim 9 wherein said at least one blade is rotatably journalled on said floating sleeve, said floating sleeve being freely rotatable about said shaft and having a radially extending post for engaging said blade gear of said at least one blade, said blade gear being secured between said post and a post capping disc, said post capping disc being attached directly to said post such that said blade gear can rotate freely about said blade axis between said floating sleeve and said post capping disc thereby allowing rotation of said at least one blade about said blade axis.

14. The device of claim 13 wherein said floating sleeve rotates within limits about said shaft.

15. The device of claim 13 wherein said stop means comprises a radial step on said blade gear which engages a first or second stop mechanism on said capping disc corresponding respectively to said first or second stop position.

16. The device of claim 11 wherein said blade gear has a cam-like cavity and wherein a spring driven detent-type mechanism is mounted in said thrust collar and is capable of communication with said cam-like cavity to constrain rotation of said at least one blade in a third stop position between said first and second stop positions.

17. The device of claim 11 wherein said blade gear has a cam-like cavity and wherein an elastomeric-type protrusion is mounted in said thrust collar and is capable of communication with said cam-like cavity to constrain rotation of said at least one blade in a third stop position between said first and second stop positions.

18. A fluid dynamic propeller, comprising:

an axially oriented shaft sleeve having a drive pinion at one end thereof;

a floating sleeve rotatable about said shaft sleeve, said floating sleeve having at least one radially extending pivot post;

a blade gear rotatably positioned about said at least one pivot post in communication with said drive pinion of said shaft sleeve;

a post capping disc attached to said at least one post of said floating sleeve so as to retain said blade gear between said capping disc and said floating sleeve;

a blade mounted on said blade gear so as to rotate with said blade gear about a blade axis substantially perpendicular to the length of said shaft sleeve; and stop means on said pivot post or on said capping disc for restricting rotation of said blade gear in a first direction about said blade axis at a first stop position and restricting rotation of said blade gear in the opposite direction about said blade axis at a second stop position, said first and second stop positions being at least 120 degrees apart about said blade axis.

* * * * *